(12) United States Patent
Chavan

(10) Patent No.: US 12,505,123 B2
(45) Date of Patent: Dec. 23, 2025

(54) SYSTEM AND METHOD FOR HANDLING DATA CONSOLIDATION FROM AN EDGE DEVICE TO A TARGET DATABASE

(71) Applicant: Mahendra Chavan, Maharashtra (IN)

(72) Inventor: Mahendra Chavan, Maharashtra (IN)

( * ) Notice: Subject to any disclaimer, the term of this patent is extended or adjusted under 35 U.S.C. 154(b) by 4 days.

(21) Appl. No.: 18/717,900

(22) PCT Filed: Dec. 5, 2022

(86) PCT No.: PCT/IB2022/061764
§ 371 (c)(1),
(2) Date: Jun. 7, 2024

(87) PCT Pub. No.: WO2023/111765
PCT Pub. Date: Jun. 22, 2023

(65) Prior Publication Data
US 2025/0045298 A1 Feb. 6, 2025

(30) Foreign Application Priority Data

Dec. 17, 2021 (IN) .............................. 202121059027

(51) Int. Cl.
*G06F 7/00* (2006.01)
*G06F 16/23* (2019.01)
*G06F 16/27* (2019.01)
*G06F 17/00* (2019.01)

(52) U.S. Cl.
CPC ........ *G06F 16/273* (2019.01); *G06F 16/2358* (2019.01); *G06F 16/2379* (2019.01)

(58) Field of Classification Search
None
See application file for complete search history.

(56) References Cited

U.S. PATENT DOCUMENTS

2016/0179918 A1* 6/2016 Martin ................. G06F 16/951
707/613
2021/0280287 A1* 9/2021 Mahmood ............. G16H 10/60

* cited by examiner

*Primary Examiner* — Tuan A Pham
(74) *Attorney, Agent, or Firm* — Novel Patent Services LLC

(57) ABSTRACT

An application running on one or more edge devices for executing a plurality of transactions. A wrapper class captures the plurality of transactions executed by the application in form of a plurality of transaction logs. A remote directory includes one or more device directories corresponding to the one or more edge devices, wherein the one or more device directories store the plurality of transaction logs of one or more synced edge devices. A target database consolidator including a replicator to read the plurality of transactions, replicate each of the plurality of transaction logs of each of the one or more synced edge devices, generates a plurality of change log files for each of a plurality of command log files; a device scheduler manages scheduling of at least one of the one or more edge devices, the plurality of change log files for initiating data consolidation. A consolidator reads schema, the plurality of transactions from the plurality of change log files, consolidates the initial data from the plurality of replica database files into the target database.

12 Claims, 5 Drawing Sheets

SYSTEM AND METHOD FOR HANDLING DATA CONSOLIDATION FROM AN EDGE DEVICE TO A TARGET DATABASE

FIELD OF THE INVENTION

The present disclosure relates generally to database systems, and more particularly, to a system and a method for handling data consolidation from an edge device to a target database.

BACKGROUND

A database system is a system designed to manage a database and run operations and commands on the data requested by numerous users. The database management system is a set of programs that manages the organization, storage and retrieval of data in a database. The programs may include: a modelling language, o define the schema of each database located in the database management system, data structures such as fields, records, files and objects optimized to deal with a very large amount of data stored on a device, and a database query language to allow users to interact with the database and analyze its data and update it.

Apart from all such features, replication of data from one database to another database is an utmost concern. As a result, various systems are available which facilitates data replication from one database to another. Conventionally, the system available for data replication includes transactionally replicating or consolidating data from a source database into a remote RDBMS/data warehouse of choice. However, for continuous change tracking and capturing (change-data-capture) in case of SQLite database, it has to use an approach such as periodical data pulling or trigger-based approaches which lack ensuring transactional consistency on the target system.

Also, such a conventional system has to build its own interface such as a web service to send the changed data records to the remote server. Such a web service is supposed to apply these data records to the target system and could often become a bottleneck in the presence of several hundreds of thousands of syncing application instances. Moreover, it is very specific to their application and database and cannot be reused as is across other applications. Also, it is hard to ensure exactly once semantics in data consolidation especially in presence of application failures/restarts i.e., it is hard to ensure no database table record shows up duplicated or missing on the target.

Hence, there is a need for an improved system and a method for handling data consolidation from an edge device to a target database in order to address the aforementioned issues.

SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key nor critical elements of all embodiments, nor delineate the scope of any or all embodiments.

The present disclosure, in one or more embodiments, relates to a system for handling data consolidation from an edge device to a target database is disclosed. In one embodiment herein, the system includes a processing subsystem hosted on a server and configured to execute on a network to control bidirectional communications among a plurality of entities. The processing subsystem includes an application running on one or more edge devices for executing a plurality of transactions. The processing subsystem also includes a wrapper class loaded on top of the application, wherein the wrapper class is configured to capture the plurality of transactions executed by the application in form of a plurality of transaction logs.

In one embodiment herein, the processing subsystem also includes a remote directory hosted on a remote server. The remote directory includes one or more device directories corresponding to the one or more edge devices, wherein the one or more device directories are configured to store the plurality of transaction logs of one or more synced edge devices, upon remote shipping to set up a plurality of replica database files. The processing subsystem also includes a target database consolidator including a replicator configured to read the plurality of transactions from the plurality of transaction logs. The replicator is also configured to replicate each of the plurality of transaction logs of each of the one or more synced edge devices upon reading the plurality of transactions.

In one embodiment herein, the replicator is also configured to generate a plurality of change log files for each of a plurality of command log files of the plurality of transaction logs. The target database consolidator also includes a device scheduler configured to manage scheduling of at least one of the one or more edge devices, the plurality of change log files generated by the replicator for initiating data consolidation. The target database consolidator also includes a consolidator configured to read schema and initial data from the plurality of replica database files fetched from the remote directory.

In one embodiment herein, the consolidator is also configured to read the plurality of transactions from the plurality of change log files generated over a continued interval, wherein the plurality of transactions comprises one or more operations executed in a source database. The consolidator is also configured to consolidate the initial data from the plurality of replica database files into the target database by performing consolidation in at least two modes upon reading of the plurality of the change log files.

In one embodiment herein, a method for handling data consolidation from an edge device to a target database is disclosed. The method includes running an application on one or more edge devices for executing a plurality of transactions. The method also includes capturing, by a wrapper class, the plurality of transactions executed by the application in form of a plurality of transaction logs. The method also includes storing, by one or more device directories of a remote directory, the plurality of transaction logs of one or more synced edge devices, upon remote shipping to set up a plurality of replica database files.

The method also includes reading, by a replicator located on a target database consolidator, the plurality of transactions from the plurality of transaction logs. The method also includes replicating, by the replicator of the target database consolidator, each of the plurality of transaction logs of each of the one or more synced edge devices upon reading the plurality of transactions. The method also includes generating, by the replicator of the target database consolidator, a plurality of change log files for each of a plurality of command log files of the plurality of transaction logs.

The method also includes managing, by a device scheduler of the target database consolidator, scheduling of at least one of the one or more edge devices, the plurality of change log files generated by the replicator for initiating data consolidation. The method also includes reading, by a consolidator of the target database consolidator, schema and initial data from the plurality of replica database files fetched from the remote directory.

The method also includes reading, by the consolidator of the target database consolidator, the plurality of transactions from the plurality of change log files generated over a continued interval, wherein the plurality of transactions comprises one or more operations executed in a source database. The method also includes consolidating, by the consolidator of the target database consolidator, the initial data from the plurality of replica database files into the target database by performing consolidation in at least two modes upon reading of the plurality of the change log files.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1:
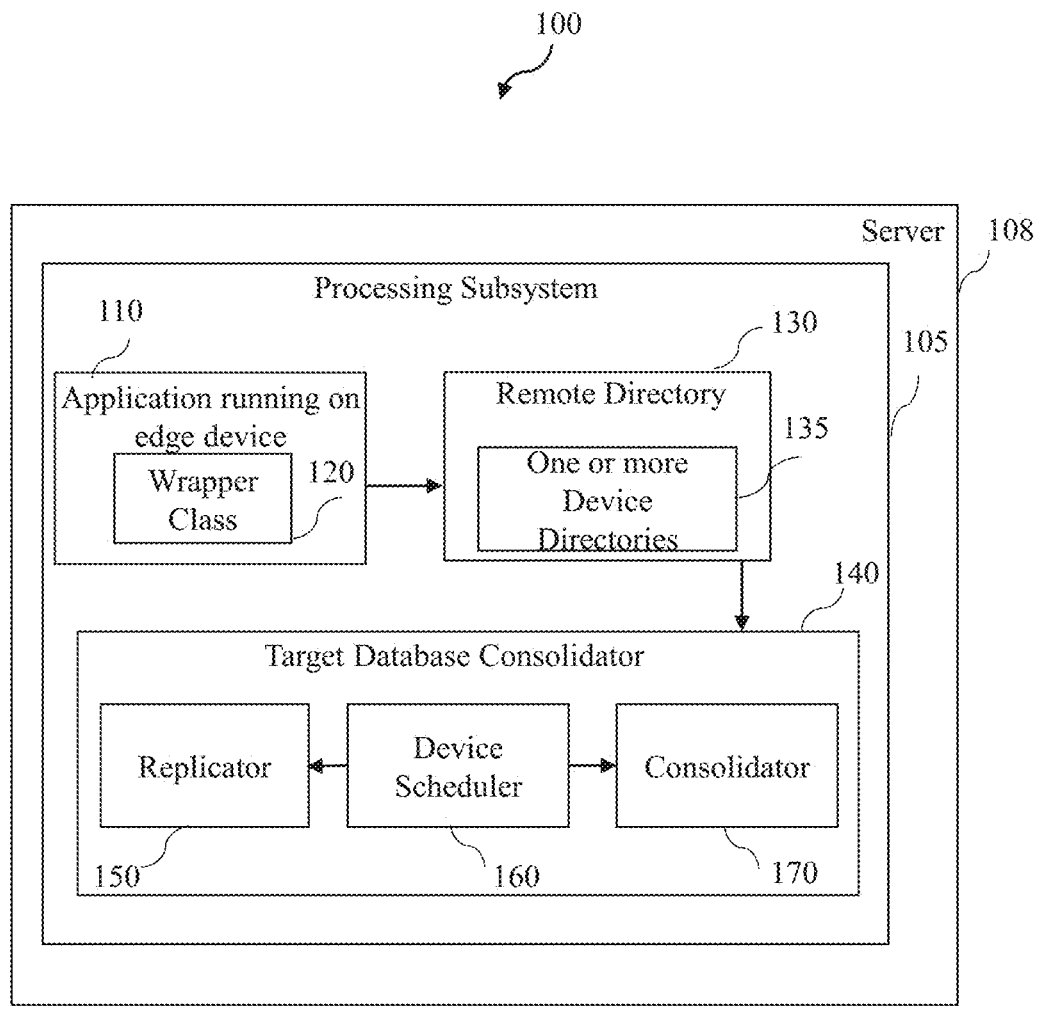
FIG. 1 illustrates a block diagram of a system for handling data consolidation from an edge device to a target database, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

Embodiments of the present disclosure relate to a system and a method for handling data consolidation from an edge device to a target database. The system includes a processing subsystem hosted on a server and configured to execute on a network to control bidirectional communications among a plurality of entities. The processing subsystem includes an application running on one or more edge devices for executing a plurality of transactions. The processing subsystem also includes a wrapper class loaded on top of the application, wherein the wrapper class is configured to capture the plurality of transactions executed by the application in form of a plurality of transaction logs.

The processing subsystem also includes a remote directory hosted on a remote server. The remote directory includes one or more device directories corresponding to the one or more edge devices, wherein the one or more device directories are configured to store the plurality of transaction logs of one or more synced edge devices, upon remote shipping to set up a plurality of replica database files. The processing subsystem also includes a target database consolidator including a replicator configured to read the plurality of transactions from the plurality of transaction logs. The replicator is also configured to replicate each of the plurality of transaction logs of each of the one or more synced edge devices upon reading the plurality of transactions.

The replicator is also configured to generate a plurality of change log files for each of a plurality of command log files of the plurality of transaction logs. The target database consolidator also includes a device scheduler configured to manage scheduling of at least one of the one or more edge devices, the plurality of change log files generated by the replicator for initiating data consolidation. The target database consolidator also includes a consolidator configured to read schema and initial data from the plurality of replica database files fetched from the remote directory.

The consolidator is also configured to read the plurality of transactions from the plurality of change log files generated over a continued interval, wherein the plurality of transactions comprises one or more operations executed in a source database. The consolidator is also configured to consolidate the initial data from the plurality of replica database files into the target database by performing consolidation in at least two modes upon reading of the plurality of the change log files.

FIG. 1 refers to a block diagram of a system 100 for handling data consolidation from an edge device to a target database in accordance with an embodiment of the present disclosure. The system 100 includes a processing subsystem 105 hosted on a server 108. In one embodiment, the server 108 may include a cloud server. In another embodiment, the server 108 may include a local server. The processing subsystem 105 is configured to execute on a network (not shown in FIG. 1) to control bidirectional communications among a plurality of entities. In one embodiment, the network may include a wired network such as local area network (LAN). In another embodiment, the network may include a wireless network such as Wi-Fi, Bluetooth, Zigbee, near field communication (NFC), infra-red communication (RFID) or the like.

The processing subsystem 105 includes an application running on one or more edge devices for executing a plurality of transactions. In one embodiment, the application utilizes a relational database management system's (RDBMS) software component enabling the application to interface with the source database for data storage and retrieval in a database file. In such embodiment, the software component may include a JDBC driver. In some embodiment, the source database may include an embedded database using an application wrapper mechanism. In such embodiment, the embedded database may include SQLite application.

The processing subsystem 105 also includes a wrapper class 120 loaded on top of the application 110, wherein the wrapper class 120 is configured to capture the plurality of transactions executed by the application in form of a plurality of transaction logs. In one embodiment, the plurality of transaction logs may include at least one of a plurality of backup files of a source database, a plurality of control files, a plurality of command log files or a combination thereof. In such embodiment, the plurality of command logs may include portable files of log format for storing, shipping and managing raw database write operations or commands. In another embodiment, the plurality of change log files may include a portable log format for storing change log or change data capture log utilized for any database system.

The processing subsystem 105 also includes a remote directory 130 hosted on a remote server. The remote directory 130 includes one or more device directories 135 corresponding to the one or more edge devices, wherein the one or more device directories 135 are configured to store the plurality of transaction logs of one or more synced edge devices, upon remote shipping to set up a plurality of replica database files. In one embodiment, the remote directory may include at least one of S3 bucket, a secure file transfer protocol (SFTP) location or a combination thereof.

In an instance, when the application starts, a device directory with name synclite_<optional_configured_device_name>_<UUID> is created alongside a SQLite database file (under the same path as that of SQLite database file) that holds the initial data backup of the SQLite database, a control file and all the generated command log files. All contents of this device directory are continuously shipped to a configured remote location (the SFTP location, the S3 bucket etc.) asynchronously while the application is running. The logs are held up in case of no connectivity and are shipped as soon as the connectivity is up.

Upon successful shipping of an artifact, it is deleted from the device directory on the device. Encryption can be enabled as a data security measure. With encryption enabled, all files are encrypted prior to shipping to the remote location. A single remote location contains device directories of all such individual syncing application instances on the one or more edge devices which are running the application using SyncLite wrapper driver and are configured to use this remote location.

The processing subsystem 105 also includes a target database consolidator 140 including a replicator 150 configured to read the plurality of transactions from the plurality of transaction logs. The replicator 150 is also configured to replicate each of the plurality of transaction logs of each of the one or more synced edge devices upon reading the plurality of transactions. The replicator 150 is also configured to generate a plurality of change log files for each of a plurality of command log files of the plurality of transaction logs. The replicator while applying command logs, it generates change logs for each database record that is affected as a result of application of a given command from command logs and stores these change logs in changelog files in the same device directory. There is exactly one changelog file corresponding to each command log file.

The target database consolidator 140 also includes a device scheduler 160 configured to manage scheduling of at least one of the one or more edge devices, the plurality of change log files generated by the replicator for initiating data consolidation. The target database consolidator 140 also includes a consolidator 170 configured to read schema and initial data from the plurality of replica database files fetched from the remote directory. The consolidator 170 is also configured to read the plurality of transactions from the plurality of change log files generated over a continued interval, wherein the plurality of transactions comprises one or more operations executed in a source database. In one embodiment, the one or more operations may include at least one of a create table operation, drop table operation, alter table operation, add column operation, rename table operation, delete table operation, inert table operation, update table operation or a combination thereof.

The consolidator 170 is also configured to consolidate the initial data from the plurality of replica database files into the target database by performing consolidation in at least two modes upon reading of the plurality of the change log files. The consolidator performs consolidation to configured target system such as PostgreSQL, MySQL and the like for each device in one of the at least two configured modes. Here, the consolidation is performed to the target database by table schema creation or alteration phase, initial data copy phase and continuous changelog apply phase.

In one embodiment, the at least two configured modes may include a copy mode and a merge mode. In the copy mode, a schema is created corresponding to each device in the configured database. For example, if the application had configured a device name, then the schema would be created with that device name or else the UUID is used as a schema name. All the tables for each device are then replicated in its respective schema on the target system as it is.

In the merge mode, a single table is created on the target system in the configured database and schema to hold the data for the corresponding table from each syncing device. Two additional columns are added to each target table: synclite_device_name, synclite_device_id to differentiate which device a given record belongs to. These columns enable doing any kind of device-wise analytics out of the consolidated data in the target system. Consolidation mode is more suitable for performing holistic real-time analytics across all the syncing devices as a table's data from each device sits together in a single database table on the target system.

In a specific embodiment, the target database consolidator 140 is configured to generate a histogram for one or more key columns of one or more tables of the initial data being consolidated. Since the target database includes all the data consolidated from the one or more edge devices and is used for performing complex analytical queries, such analytical queries often go through a state-of-the-art query optimization routine in the target database. This query optimizer is responsible for generating an optimal query plan for each query executed on the target database and hence it heavily depends upon the data distribution of the individual table columns.

As used herein, the term 'histogram' is defined as a well-known technique in databases that represents data distributions and are used heavily by database query optimizers. However, creating and maintaining such histograms is a challenge in presence of changing data in the database. Refreshing these histograms is often resource intensive. On the other hand, the more accurate the histograms, the more optimal are the query plans chosen by the target database resulting in faster execution of complex analytical queries. The target database consolidator 140 can thus generate and maintain the histograms for each consolidated table outside the target database without consuming target database resources and the target database can periodically import these readily available histograms from the target database consolidator 140 and make use of them for better query optimization, ions and optimal query plan generations.

The target database consolidator 140 along with generation of the histogram for one or more key columns of one or more tables of the initial data being consolidated, keeps updating it while applying the changelogs to the target database. The target database consolidator 140 also make available the histogram generated from the target database consolidator for importing in target database on periodic basis for utilizing in query optimizations and optimal query plan generation on the target database.

Figure 2:
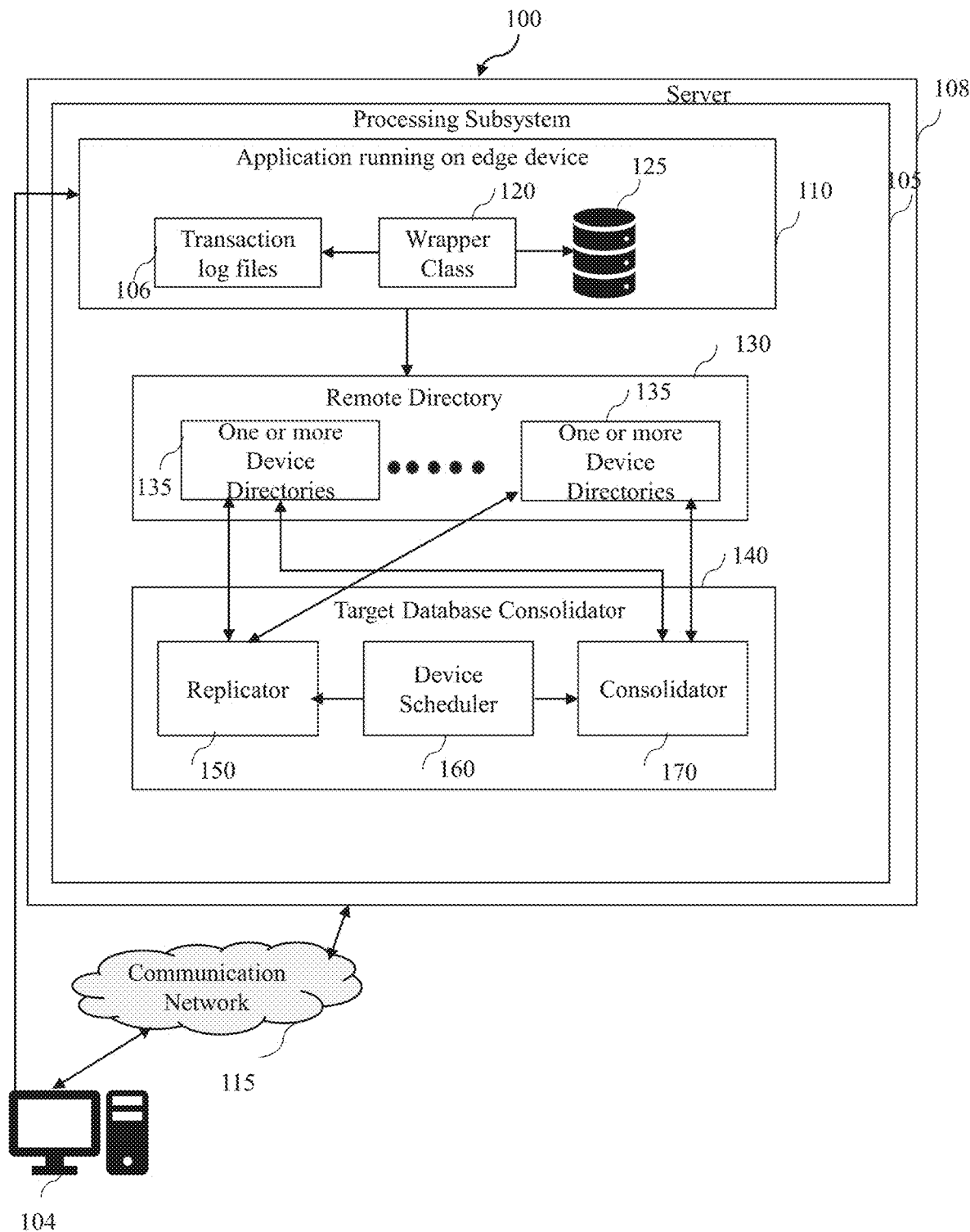
FIG. 2 illustrates a schematic representation of an exemplary embodiment of a system for handling data consolidation from an edge device to a target database of FIG. 1, in accordance with embodiments of the invention.

FIG. 2 refers to a schematic representation of an exemplary embodiment of a system for handling data consolidation from an edge device to a target database of FIG. 1 in accordance with an embodiment of the present disclosure. Considering an example, where the system 100 is utilized in an enterprise for data replication or consolidation from an edge device of a source database such as SQLite application to a target database such as a SyncLite application. In such a scenario, for data replication, the system 100 includes a processing subsystem 105 which is hosted on a cloud server 108. The processing subsystem 105 is configured to execute on a wireless communication network 115 to control bidirectional communications among a plurality of entities.

Here, the processing subsystem 105 includes an application running on one or more edge devices 104 including, but not limited to, android phones, IOT devices, desktops and the like.

The application utilizes a relational database management system's (RDBMS) software component enabling the application to interface with the source database for data storage in a database 125 and retrieval in a database file. In the example used herein, the software component may include aJDBC driver. For example, the source database may include an embedded database using an application wrapper mechanism, wherein the embedded database may include SQLite application.

The wrapper class 120 which is loaded on top of the application 110, is configured to capture the plurality of transactions executed by the application in form of a plurality of transaction logs 106. For example, the plurality of transaction logs may include at least one of a plurality of backup files of a source database, a plurality of control files, a plurality of command log files or a combination thereof. In such embodiment, the plurality of command logs may include portable files of log format for storing, shipping and managing raw database write operations or commands. In another example, the plurality of change log files may include a portable log format for storing change log or change data capture log utilized for any database system.

The processing subsystem 105 also includes a remote directory 130 hosted on a remote server. The remote directory 130 includes one or more device directories 135 corresponding to the one or more edge devices, wherein the one or more device directories 135 are configured to store the plurality of transaction logs of one or more synced edge devices, upon remote shipping to set up a plurality of replica database files. In the example used herein, the remote directory may include at least one of S3 bucket, a secure file transfer protocol (SFTP) location or a combination thereof.

The processing subsystem 105 also includes a target database consolidator 140 including a replicator 150 configured to read the plurality of transactions from the plurality of transaction logs. The replicator 150 is also configured to replicate each of the plurality of transaction logs of each of the one or more synced edge devices upon reading the plurality of transactions. The replicator 150 is also configured to generate a plurality of change log files for each of a plurality of command log files of the plurality of transaction logs. The replicator while applying command logs, it generates change logs for each database record that is affected as a result of application of a given command from command logs and stores these change logs in changelog files in the same device directory. There is exactly one changelog file corresponding to each command log file.

Further, the target database consolidator 140 also includes a device scheduler 160 configured to manage scheduling of at least one of the one or more edge devices, the plurality of change log files generated by the replicator for initiating data consolidation. The target database consolidator 140 also includes a consolidator 170 configured to read schema and initial data from the plurality of replica database files fetched from the remote directory. The consolidator 170 is also configured to read the plurality of transactions from the plurality of change log files generated over a continued interval, wherein the plurality of transactions comprises one or more operations executed in a source database.

The consolidator 170 is also configured to consolidate the initial data from the plurality of replica database files into the target database by performing consolidation in at least two modes upon reading of the plurality of the change log files. The consolidator performs consolidation to configured target system such as PostgreSQL, MySQL and the like for each device in one of the at least two configured modes.

For example, for a data which is stored in the one or more device directories have the device name as: AppForJohnC, and the device_id: f8c3de3d-1fea-4d7c-$a$8b0-29f63c4c3454 and another device_name: AppForMaryL and the device_id: a8c3fe3d-15ea-4d7c-$b$8b0-39f63c4c5454, then in the data consolidation, the device id and device name is utilised creating replica of all the tables for each device in its respective schema on the target system as it is. Consolidation on the target system involves following phases for each device.

The consolidation includes Table Schema Creation/Alteration: If the mode is set to COPY then tables are created in respective schemas for each device. If the mode is set to MERGE, then the table may be pre-existing as all devices share the same tables, in which case the tables may be altered to add additional columns if any. In the COPY mode, when the sync mode is set to COPY then tables are created on the target database system/data warehouse in respective schemas exactly as they are on the source SQLite database in syncing devices. This includes preserving NON-NULL constraints, default constraints, primary key information etc.

Again, while creating the tables on the target database system/data warehouse in the MERGE mode, with sync mode set to MERGE, each table on the target database system is supposed to contain the data for all syncing devices. Hence, the tables are created/managed such that they can hold data from without any restrictions. For example, all columns are created as NULLABLE in all tables. If a table has a primary key, then the two additional columns synclite_device_id and synclite_device_name as added to each table are also included in the primary key. Since multiple devices could be syncing, a table might already exist as a result of some device already started syncing when the target database consolidator attempts to create a table for a particular device.

In that case, target database consolidator checks if there are any additional columns present in this device's table over and above the already existing columns in the target table and if they do, it executes ALTER TABLE ADD COLUMN for all such columns. This is how the table schemas on the target database system are expanded to conservatively include/manage data for all syncing devices. During initial data copy, initial data for each table is read from the replica database file of each device and ingested into the respective table on the target system. Again, in continuous changelog Apply, change logs from generated changelog files for each device are continuously applied in the correct order and by following exact same transaction boundaries as were originally executed by the user application on the device.

The target database consolidator is capable of handling all kinds of DDL operations supported by SQLite. Following is how DDL operations are handled depending on the specified sync mode. In COPY mode, all DDL operations such as CREATE TABLE, DROP TABLE, ALTER TABLE, ADD COLUMN, ALTER TABLE DROP COLUMN, ALTER TABLE, RENAME COLUMN, RENAME TABLE are replicated as it is on the target database system.

Similarly, in case of MERGE mode, since each table on the target database system contains data for syncing devices, DDL operations received from one device have to be handled and applied carefully to the target table so as to not affect the consolidator of other devices. Following is how each DDL operation is applied in MERGE mode. For example, in case of a CREATE TABLE: If the table does not exist then it is created. If the table exists, then try to add each column if it does not exist on the target table.

All the columns are added as NULLABLE. In case of DROP TABLE: the table on target is not dropped as it might still be used by other devices. Again, in case of DELETE all the data for the device for which DROP TABLE operation has been received using a statement: DELETE FROM <table_name> WHERE synclite_device_id=<device_id> AND synclite_device_name=<device_name>. For, ALTER TABLE ADD COLUMN: If the column does not exist then add the column as NULLABLE to the target table.

In case of ALTER TABLE DROP COLUMN: Do not drop the column as it might still be used by other devices. Set all values as NULL for this column for this device with a statement: UPDATE <table_name> SET <column_name>=NULL WHERE synclite_device_id=<device_id> AND synclite_Device_name=<device_name>. Again, in case of RENAME TABLE: Do not rename the table as other devices might still be using the old name of the table. Create a new table with new name and same schema and copy all data for this device in that table with following statements such as CREATE TABLE <new_table_name>(<column schemas> INSERT INTO <new_table_name> SELECT*from <old_table_name> WHERE synclite_device_id=<device_id> AND synclite_device_name=<device_name>. DELETE from <old_table_name> WHERE synclite_device_id=<device_id> AND synclite_device_name=<device_name>.

Again, in case of ALTER TABLE RENAME COLUMN: Do not rename the column as it might still be used by other devices. Add a new column with the new name and copy all data from the old column to this new column. Further in case of ALTER TABLE ADD COLUMN, <new_column_name>. UPDATE <table_name> SET <new_column_name>=<old-column_name> WHERE synclite_device_id=<device_id> AND synclite_device_name=<device_name>. UPDATE <table_name> SET <old_column_name>. NULL WHERE synclite_device_id=<device_id> AND synclite_device_name=<device_name>.

Thus, the system 100 enables data consolidation from several devices into a single target system but also maintains live replicas of the SQLite database files of all the syncing devices, which can serve as a disaster recovery mechanism for these applications in case of various disaster situations as device hardware failure, device loss, permanent data loss and the like.

Figure 3:
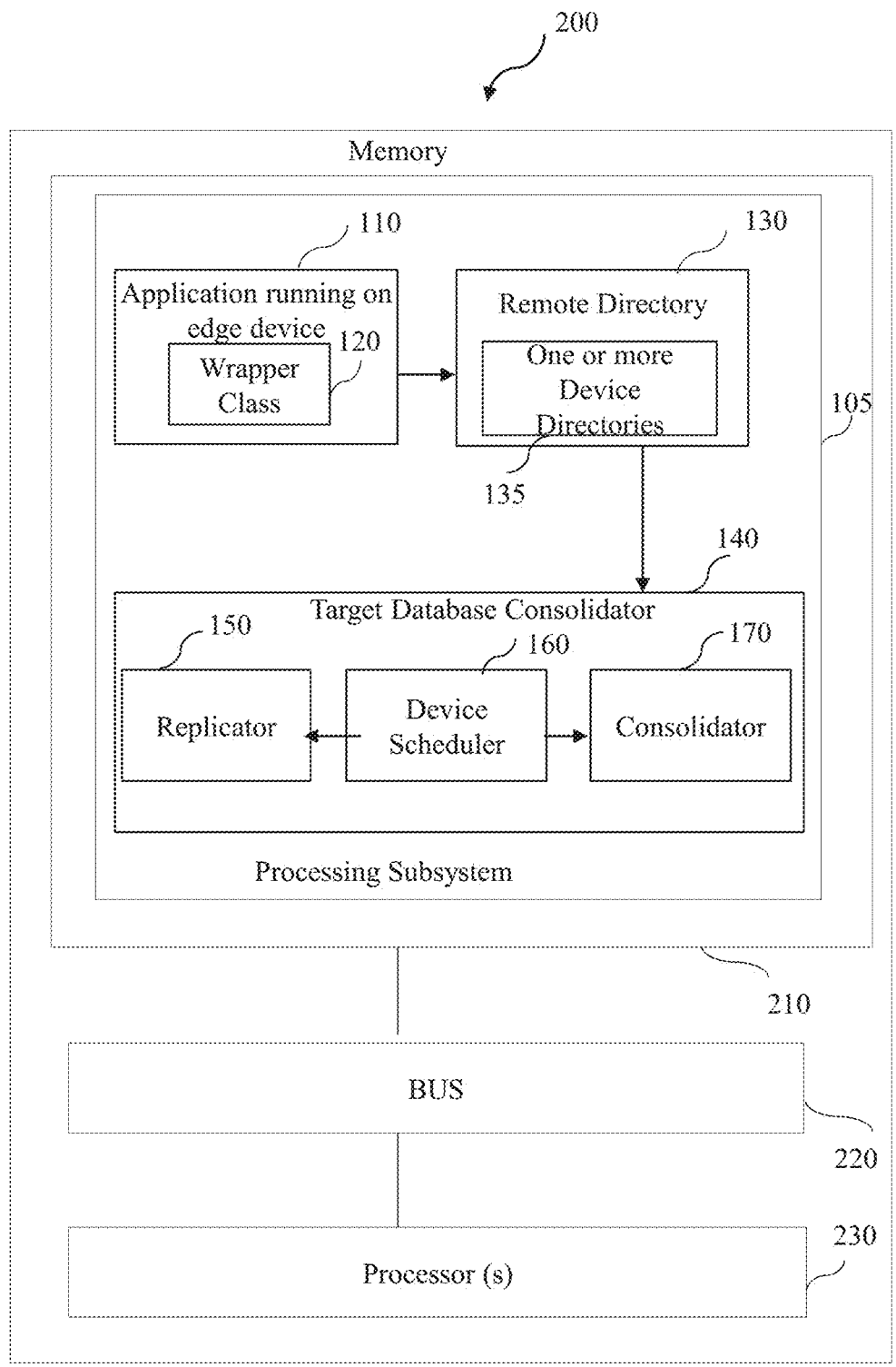
FIG. 3 illustrates a block diagram of a computer or a server, in accordance with embodiments of the invention.

FIG. 3 refers to a block diagram of a computer or a server in accordance with an embodiment of the present disclosure.

The server 200 includes processor(s) 230, and memory 210 operatively coupled to the bus 220. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes several subsystems stored in the form of executable program which instructs the processor 230 to perform the method steps illustrated in FIG. 1. The memory 210 includes a processing subsystem 105 of FIG. 1. The processing subsystem 105 further has following entities: an application 110, a wrapper class 120, a remote directory 130, one or more device directories 135, a target database consolidator 140, a replicator 150, a device scheduler 160 and a consolidator 170.

The application 110 running on one or more edge devices for executing a plurality of transactions. The wrapper class 120 loaded on top of the application 110, wherein the wrapper class 120 is configured to capture the plurality of transactions executed by the application in form of a plurality of transaction logs. The remote directory 130 includes one or more device directories corresponding to the one or more edge devices, wherein the one or more device directories 135 are configured to store the plurality of transaction logs of one or more synced edge devices, upon remote shipping to set up a plurality of replica database files.

The target database consolidator 140 including a replicator 150 configured to read the plurality of transactions from the plurality of transaction logs. The replicator 150 is also configured to replicate each of the plurality of transaction logs of each of the one or more synced edge devices upon reading the plurality of transactions. The replicator 150 is also configured to generate a plurality of change log files for each of a plurality of command log files of the plurality of transaction logs. The target database consolidator 140 also includes a device scheduler 160 configured to manage scheduling of at least one of the one or more edge devices, the plurality of change log files generated by the replicator for initiating data consolidation.

The target database consolidator 140 also includes a consolidator 170 configured to read schema and initial data from the plurality of replica database files fetched from the remote directory. The consolidator 170 is also configured to read the plurality of transactions from the plurality of change log files generated over a continued interval, wherein the plurality of transactions comprises one or more operations executed in a source database. The consolidator is also configured to consolidate the initial data from the plurality of replica database files into the target database by performing consolidation in at least two modes upon reading of the plurality of the change log files.

The bus 220 as used herein refers to be internal memory channels or computer network that is used to connect computer components and transfer data between them. The bus 220 includes a serial bus or a parallel bus, wherein the serial bus transmits data in bit-serial format and the parallel bus transmits data across multiple wires. The bus 220 as used herein, may include but not limited to, a system bus, an internal bus, an external bus, an expansion bus, a frontside bus, a backside bus and the like.

Figure 4A:
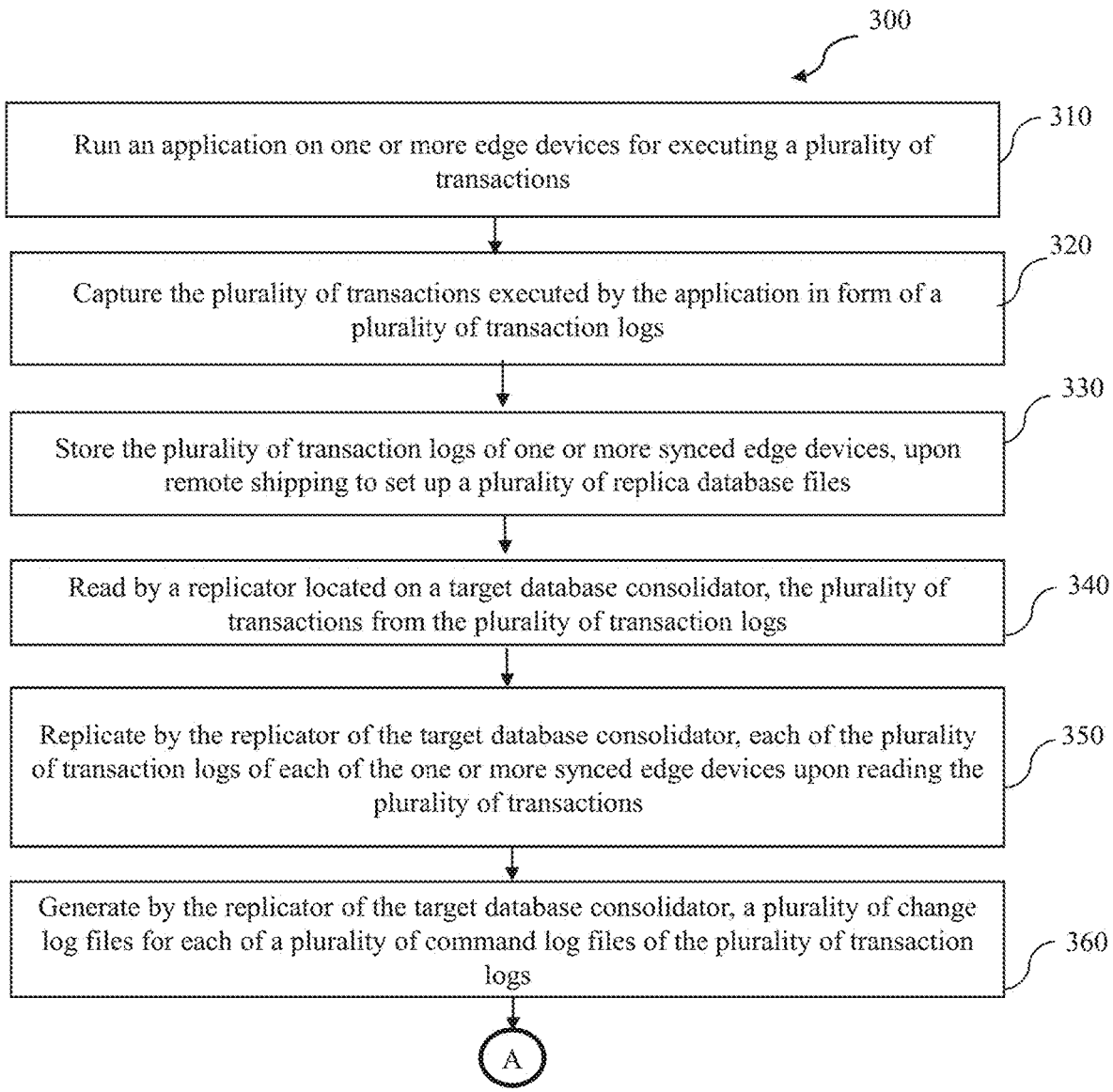
FIGS. 4A-4B illustrate a flow chart representing the steps involved in a method for handling data consolidation from an edge device to a target database, in accordance with embodiments of the invention.
Figure 4B:
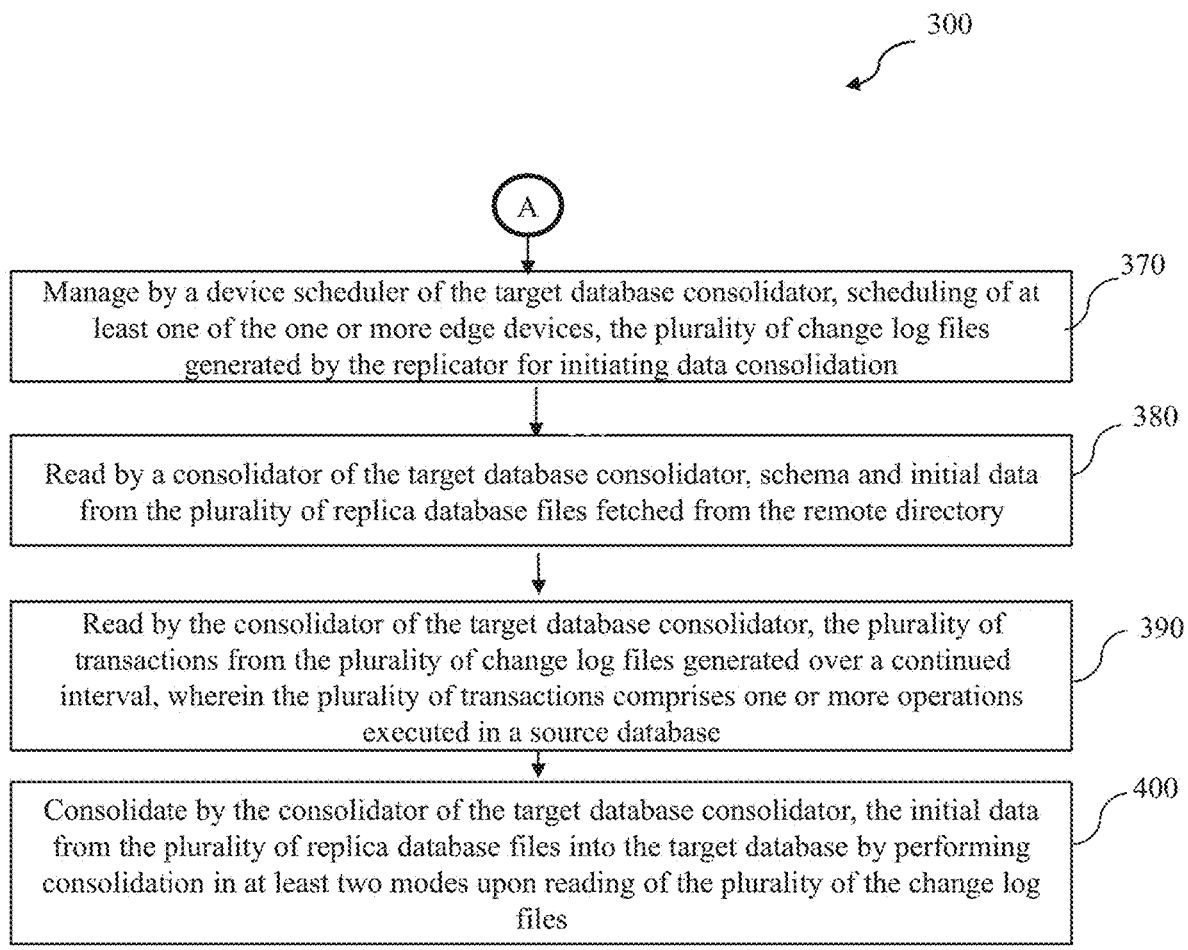

FIGS. 4A-4B refer to a flow chart representing the steps involved in a method 300 for handling data consolidation from an edge device to a target database in accordance with an embodiment of the present disclosure. The method 300 includes running an application on one or more edge devices for executing a plurality of transactions in step 310. In one embodiment, executing the plurality of transactions by the application may include utilizing a relational database management system's (RDBMS) software component for enabling the application to interface with the source database for data storage and retrieval in a database file. In such embodiment, the software component may include a JDBC driver. In some embodiment, the source database may include an embedded database using an application wrapper mechanism. In such embodiment, the embedded database may include SQLite application.

The method 300 also includes capturing, by a wrapper class, the plurality of transactions executed by the application in form of a plurality of transaction logs in step 320. In one embodiment, capturing the plurality of transactions executed in the form of transaction logs may include executing the plurality of transactions in the form of the plurality of transaction logs including at least one of a plurality of backup files of a source database, a plurality of control files, a plurality of command log files or a combination thereof. In such embodiment, the plurality of command logs may include portable files of log format for storing, shipping and managing raw database write operations or commands. In another embodiment, the plurality of change log files may include a portable log format for storing change log or change data capture log utilized for any database system.

The method 300 also includes storing, by one or more device directories of a remote directory, the plurality of transaction logs of one or more synced edge devices, upon remote shipping to set up a plurality of replica database files in step 330. In some embodiment, storing the plurality of transaction logs of the one or more synced edge devices in the one or more device directories of the remote directory may include storing the plurality of transaction logs of one or more synced edge devices, upon remote shipping to set up a plurality of replica database files in at least one of S3 bucket, a secure file transfer protocol (SFTP) location or a combination thereof.

The method 300 also includes reading, by a replicator located on a target database consolidator, the plurality of transactions from the plurality of transaction logs in step 340. The method 300 also includes replicating, by the replicator of the target database consolidator, each of the plurality of transaction logs of each of the one or more synced edge devices upon reading the plurality of transactions in step 350. The method 300 also includes generating, by the replicator of the target database consolidator, a plurality of change log files for each of a plurality of command log files of the plurality of transaction logs in step 360.

The method 300 also includes managing, by a device scheduler of the target database consolidator, scheduling of at least one of the one or more edge devices, the plurality of change log files generated by the replicator for initiating data consolidation in step 370. The method 300 also includes reading, by a consolidator of the target database consolidator, schema and initial data from the plurality of replica database files fetched from the remote directory in step 380. The method 300 also includes reading, by the consolidator of the target database consolidator, the plurality of transactions from the plurality of change log files generated over a continued interval, wherein the plurality of transactions comprises one or more operations executed in a source database in step 390.

In one embodiment, reading the plurality of transactions from the plurality of change log files generated over the continued interval may include reading the reading the plurality of transactions including the one or more operations such as at least one of a create table operation, drop table operation, alter table operation, add column operation, rename table operation, delete table operation, inert table operation, update table operation or a combination thereof.

The method 300 also includes consolidating, by the consolidator of the target database consolidator, the initial data from the plurality of replica database files into the target database by performing consolidation in at least two modes upon reading of the plurality of the change log files in step 400. In some embodiment, the at least two modes may include a copy mode and a merge mode. In such embodiment, in the copy mode the copy mode, a schema is created corresponding to each device in the configured database. In another embodiment, in the merge mode, a single table is created on the target system in the configured database and schema to hold the data for the corresponding table from each syncing device.

In accordance with an embodiment of a present disclosure, various use-cases for the system 100 includes, but not limited to, live transactional data consolidation from a large number of SQLite application instances running on edge devices to a single database system of our choice, migration of an SQLite database to a database system of our choice, disaster recovery for SQLite applications, an online transaction processing (OLTP) front-end for online analytical processing (OLAP) systems, time travel queries on consolidated data, point-in-time recovery for SQLite database and the like.

Various embodiments of the present disclosure provide a solution that has a capability to continuously and transactionally replicate/consolidate data from an SQLite database from an edge device, desktop application etc. into a remote RDBMS/data warehouse of choice. Moreover, the present disclosed system promises to solve several challenges and offers a generic, reusable, fully robust and scalable data consolidation platform that can be plugged in to any SQLite application in order to capture and consolidate in real-time all changes transactionally and ensuring exactly-once semantics on the target database system/data warehouse, without needing the user to implement any web interface for data receptions and ingestion into target database system/data warehouse.

Furthermore, the present disclosed system provides an approach for relational data consolidation in a MANY-TO-ONE setting from several sources into a single target in the presence of schema/structure changes which may happen in any source at any point. In addition, the system further ensures no transactions are missed to be captured and ensures complete transactional consistency during data consolidation in presence of network disconnections, application shutdowns, crash restarts etc. Also, the system ensures that the target system is scalable and supports consolidation of any number of devices into a given target system.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

What is claimed is:

1. A system for handling data consolidation from an edge device to a target database, comprising:
   at least one processor; and
   a memory storing instructions that, when executed by the processor, cause the system to:
   execute a processing subsystem hosted on a server and configured to execute on a network to control bidirectional communications among a plurality of entities comprising:
   an application running on one or more edge devices, the application configured to execute a plurality of transactions;
   a wrapper class loaded on top of the application, wherein the wrapper class is configured to capture the plurality of transactions executed by the application in form of a plurality of transaction logs;
   a remote directory hosted on a remote server and communicatively coupled to the application, wherein the remote directory comprises one or more device directories corresponding to the one or more edge devices, wherein the one or more device directories are configured to store the plurality of transaction logs of one or more synced edge devices, upon transmission of transaction log data to set up a plurality of replica database files;
   a target database consolidator communicatively coupled to the remote directory, wherein the target database consolidator comprises:
   a replicator configured to:
   read the plurality of transactions from the plurality of transaction logs;
   replicate each of the plurality of transaction logs of each of the one or more synced edge devices upon reading the plurality of transactions; and
   generate a plurality of change log files for each of a plurality of command log files of the plurality of transaction logs;
   a device scheduler communicatively coupled to the replicator, wherein the device scheduler is configured to manage scheduling of at least one of the one or more edge devices, the plurality of change log files generated by the replicator for initiating data consolidation;
   a consolidator communicatively coupled to the device scheduler, wherein the consolidator is configured to:
   read schema and initial data from the plurality of replica database files fetched from the remote directory;
   read the plurality of transactions from the plurality of change log files generated over a continued interval, wherein the plurality of transactions comprises one or more operations executed in a source database; and
   consolidate the initial data from the plurality of replica database files into the target database by performing consolidation in at least two modes, comprising a copy mode and a merge mode, upon reading of the plurality of the change log files.

2. The system of claim 1, wherein the application utilizes a relational database management system's software component enabling the application to interface with the source database for data storage and retrieval in a database file.

3. The system of claim 1, wherein the source database comprises an embedded database using an application wrapper mechanism.

4. The system of claim 1, wherein the plurality of transaction logs comprises at least one of a plurality of backup files of a source database, a plurality of control files, a plurality of command log files or a combination thereof.

5. The system of claim 1, wherein the remote directory comprises at least one of S3 bucket, a secure file transfer protocol location or a combination thereof.

6. The system of claim 1, wherein the plurality of command log files comprises portable files of log format for storing, shipping and managing raw database write operations or commands.

7. The system of claim 1, wherein the plurality of change log files comprises a portable log format for storing change log or change data capture log utilized for any database system.

8. The system of claim 1, wherein the one or more operations comprises at least one of a create table operation, drop table operation, alter table operation, add column operation, rename table operation, delete table operation, inert table operation, update table operation or a combination thereof.

9. The system of claim 1, wherein the at least two modes comprises a copy mode and a merge mode.

10. The system of claim 1, wherein the consolidator is configured to perform consolidation to the target database by table schema creation or alteration phase, initial data copy phase and continuous changelog apply phase.

11. The system of claim 1, wherein the target database consolidator is configured to:
    generate a histogram for one or more key columns of one or more tables of the initial data being consolidated;
    import the histogram generated from the target database consolidator for utilizing in query optimizations and optimal query plan generation; and
    update the changelogs to the target database, thereby making available the histogram generated from the target database consolidator for importing in the target database on periodic basis for utilizing in query optimizations and optimal query plan generation on the target database.

12. A computer-implemented method executed by at least one processor and a memory of a system for operating a system for handling data consolidation from an edge device to a target database, the method comprising:
    running, by the processor, an application on one or more edge devices for executing a plurality of transactions;
    capturing, by a wrapper class, the plurality of transactions executed by the application in form of a plurality of transaction logs;
    storing, by one or more device directories of a remote directory, the plurality of transaction logs received from one or more synced edge devices, upon shipping transmission of the transaction log data to set up a plurality of replica database files;
    reading, by a replicator located on a target database consolidator, the plurality of transactions from the plurality of transaction logs;
    replicating, by the replicator of the target database consolidator, each of the plurality of transaction logs of each of the one or more synced edge devices upon reading the plurality of transactions;

generating, by the replicator of the target database consolidator, a plurality of change log files for each of a plurality of command log files of the plurality of transaction logs;

managing, by a device scheduler of the target database consolidator, scheduling of at least one of the one or more edge devices, the plurality of change log files generated by the replicator for initiating data consolidation;

reading, by a consolidator of the target database consolidator, schema and initial data from the plurality of replica database files fetched from the remote directory;

reading, by the consolidator of the target database consolidator, the plurality of transactions from the plurality of change log files generated over a continued interval, wherein the plurality of transactions comprises one or more operations executed in a source database; and consolidating, by the consolidator of the target database consolidator, the initial data from the plurality of replica database files into the target database by performing consolidation in at least two modes, comprising a copy mode and a merge mode, upon reading of the plurality of the change log files.

* * * * *